UNITED STATES PATENT OFFICE.

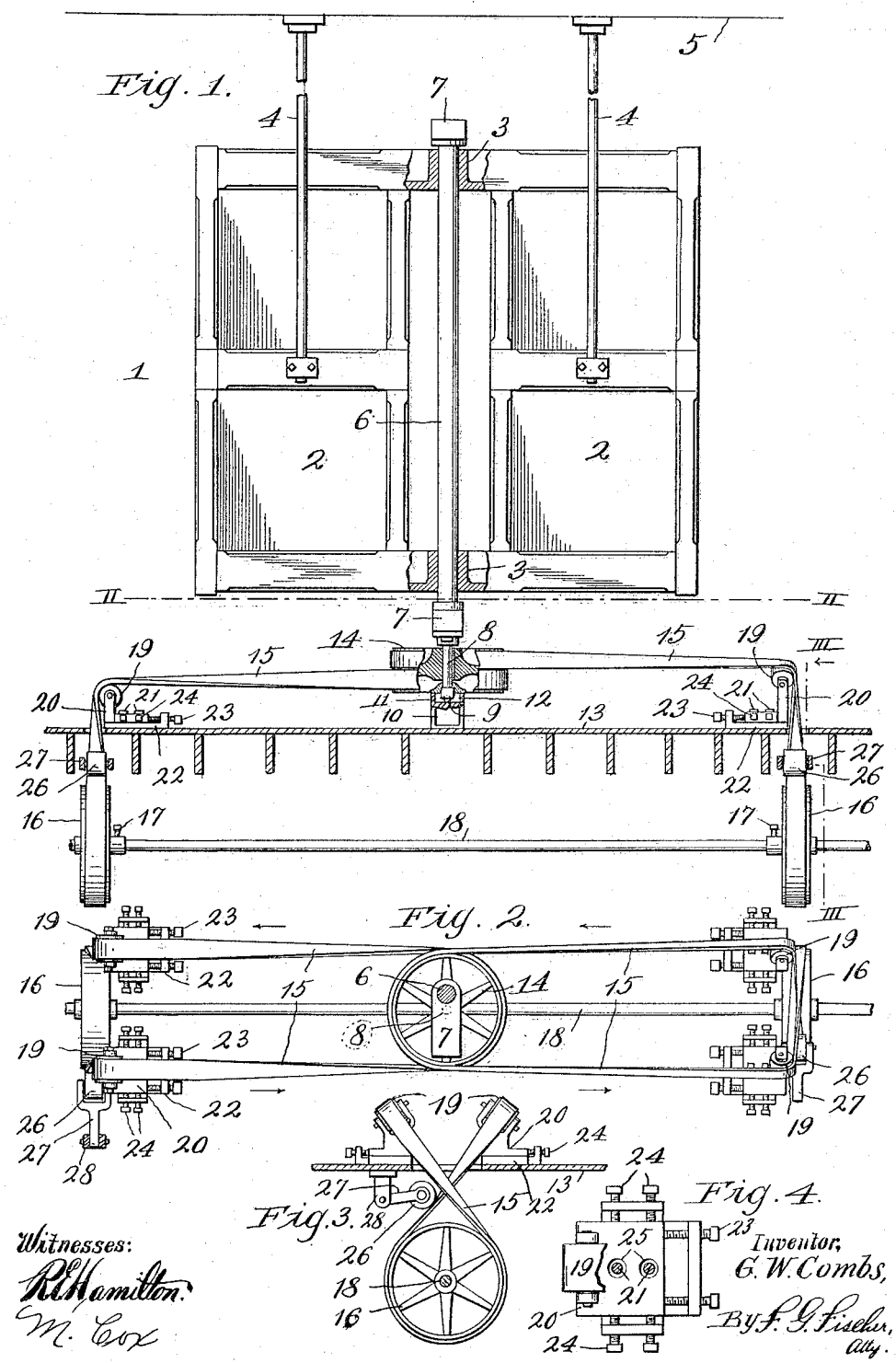

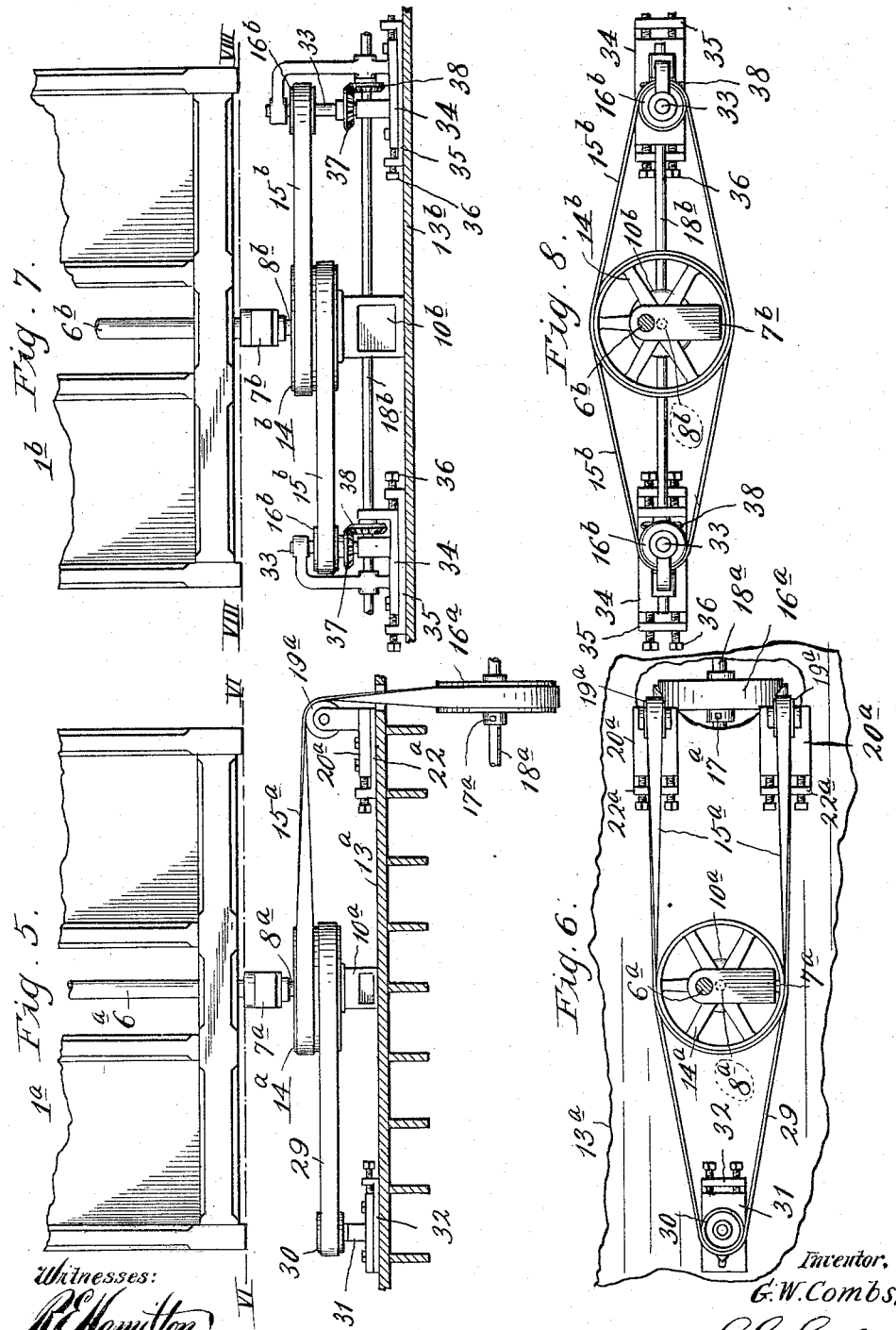

GEORGE W. COMBS, OF LEAVENWORTH, KANSAS.

GYRATORY STRUCTURE.

1,192,499.   Specification of Letters Patent.   Patented July 25, 1916.

Application filed April 26, 1909. Serial No. 492,594.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

My invention relates to improvements in gyratory structures, such for instance as screeners, sifters, bolters, sorting-machines, etc., and my object is to either overcome abnormal throw of the structure or cause it to return to its true gyratory course after leaving the same.

When the structure has a rigid connection with the building, as through its shaft and a stationary bearing, considerable strain is imposed upon the structure and the building containing the same whenever said structure leaves its true gyratory course. I relieve the building and the structure of this abnormal strain by driving the structure with flexible means whereby it is normally held to its true gyratory course, but is free to gyrate abnormally to a limited degree, as will hereinafter appear.

In the accompanying drawings, Figure 1 shows a side elevation partly in section of the invention. Fig. 2 is a horizontal section on line II—II of Fig. 1. Fig. 3 is a vertical section on line III—III of Fig. 1. Fig. 4 is a plan view of an adjustable tensioning device employed in carrying out the invention. Fig. 5 is a broken side elevation partly in section showing a modified form of the driving and restraining means. Fig. 6 is a horizontal section on line VI—VI of Fig. 5. Fig. 7 is a broken side elevation partly in section showing another modified form of the driving and restraining means. Fig. 8 is a horizontal section on line VIII—VIII of Fig. 7.

1 designates the gyratory structure, which may be of any desired type. In the drawings I have shown it comprising a pair of connected sieve-boxes 2, provided with centrally-disposed bearings 3. The sieve-boxes are freely-supported by flexible rods 4 from the ceiling 5 of the mill.

6 designates a vertically-positioned shaft journaled in bearings 3, and provided with means for imparting a gyratory motion to the structure 1, said means consisting in the present instance of eccentric-weights 7 fixed to the upper and lower portions of the shaft. The lower end of the shaft is provided with an eccentric-pin 8 arranged in the center of rotation around which shaft 6 travels. Said eccentric-pin is provided at its lower terminal with an antifriction ball 9, mounted on the flat surface of a step-bearing 10, having an upwardly-extending wall 11, forming a lubricant chamber 12 in which ball 9 is arranged. Step-bearing 10 is independent of the structure 1, and is secured upon the mill floor 13.

14 designates a pulley fixed to the eccentric-pin 8 for the purpose of rotating the same. Said pulley is driven by a plurality of endless flexible belts 15, which extend in different directions therefrom to restrain the structure from abnormal throw, or to restore it to its true gyratory path should it for any cause leave the same. Belts 15 are preferably utilized for driving pulley 14, or one of said belts may be utilized as a driving and restraining means, and the other merely as a restraining means to coöperate with its companion in holding the structure in its true gyratory course. When both belts are used in driving the pulley 14, one is crossed, as shown in Fig. 3, so that it will coöperate with its companion in driving the pulley in one direction.

16 designates a plurality of drivers, which are stationary so far as gyratory motion is concerned, but adjustably secured by set-screws 17 to a rotary shaft 18, so that they may be adjusted into proper alinement with a plurality of idlers 19.

In order to keep belts 15 taut, I provide tensioning devices comprising the idlers 19, and bearings 20 in which the shafts of said idlers are journaled. Bearings 20 are adjustably secured by bolts 21 to base-plates 22, secured to floor 13, and provided with set-screws 23 for adjusting the bearings longitudinally, or in opposite directions from each other to tighten the belts, and set-screws 24 for adjusting said bearings laterally to properly aline the idlers 19 with pulley 14. Pulley 14 may also be adjusted to a center common to the stationary or upper ends of rods 4, through the intermediacy of the set-screws 24 and the intervening elements, so that said pulley will have no tendency to pull the structure 1 to one side of its true position. In order to allow all of the above adjustments, bolts 21 extend through holes 25 in the bearings, which holes are considerably larger than the bolts to allow the bearings to be adjusted without contacting with said bolts, after which the latter are tightened to lock the bearings from accidental movement.

Ordinarily, the slack side of each belt will yield sufficiently to allow pulley 14 to gyrate to a limited degree with the structure, but in order that said pulley may have further freedom of movement under such conditions, I provide heavy idlers 26, journaled in arms 27, pivotally secured to hangers 28, depending from floor 13. The weight of idlers 26 is sufficient to take up considerable slack in the belts, but will slowly yield and pay out the slack as required to avoid shock to the building or the structure when the pulley gets to gyrating. Idlers 26, however, are of sufficient weight to ordinarily hold the structure 1 to its true gyratory course or to restore said structure to its true course when it leaves the same.

In the modified form, shown by Figs. 5 and 6, the construction and arrangement of parts is similar to that shown in the preferred form, except that but one driver is employed, and one of the belts merely acts as a restraining means, while the other drives the structure and coöperates in restraining the same from abnormal throw. Referring in detail to said modified form, $1^a$ designates the gyratory structure; $6^a$ the shaft therefor; $7^a$ the eccentric-weights fixed to the shaft; $8^a$ the eccentric-pin fixed to the lower end of shaft $6^a$; $10^a$ a step-bearing fixed to floor $13^a$ and forming a support for the eccentric-pin $8^a$; $14^a$ the pulley fixed to the eccentric-pin for rotating the same; $15^a$ the endless belt for driving pulley $14^a$; $16^a$ a driver for driving belt $15^a$; $18^a$ a shaft for driving pulley $14^a$, which latter is adjustably secured thereto by a set-screw $17^a$; $19^a$ idlers for tensioning belt $15^a$; $20^a$ bearings for carrying the idlers $19^a$, and $22^a$ base-plates upon which said bearings $20^a$ are adjustably mounted. Belt $15^a$ drives pulley $14^a$ and also assists in restraining the structure from abnormal throw, it being assisted in so restraining the structure by an endless flexible belt 29, running around pulley $14^a$ and an idler 30, the axis of which latter is journaled upon a bearing 31 adjustably secured to a base-plate 32 similar in construction to the base-plates $22^a$.

In the modified form, shown in Figs. 7 and 8, the construction and arrangement of parts is also similar to that shown in the preferred form, except that the stationary drivers are driven by cog-gearing instead of being mounted directly upon a drive-shaft similar to shaft 18. Referring in detail to said modified form, $1^b$ designates the gyratory structure; $6^b$ the shaft therefor; $7^b$ the eccentric-weights fixed to said shaft $6^b$; $8^a$ an eccentric-pin fixed to the lower end of said shaft, and supported by a step-bearing $10^b$ secured to the floor $13^b$; $14^b$ a pulley fixed to the eccentric-pin $8^b$; and $15^b$ the endless belts running around pulley $14^b$, and the stationary drivers $16^b$. Drivers $16^b$ are fixed to short vertical shafts 33, journaled in bearings 34, adjustably mounted upon base-plates 35 provided with set-screws 36 for adjusting the bearings thereon to tension the belts $15^b$. Shafts 33 are provided with fixed bevel gears 37 which are driven by bevel gears 38, slidably arranged on a shaft $18^b$, so that they may remain in mesh with bevel gears 37 when the latter are adjusted with bearings 34. Shaft $18^b$ has the ordinary groove and feather connections with the bevel gears 38, so that the latter may slide upon the shaft and be driven thereby.

Having thus described my invention, what I claim is:—

1. In combination, a gyratory structure, a shaft therefor, a support for said shaft independent of the structure, and a plurality of driving and restraining means for driving said shaft and restraining abnormal throw of the structure, said driving and restraining means extending in different directions from the shaft.

2. In combination, a gyratory structure having centrally-disposed bearings, a shaft mounted in said bearings, and a plurality of flexible means for driving the shaft and restraining abnormal throw of the structure, said means extending in opposite directions from the shaft.

3. In combination, a body freely-supported, a vertically-positioned shaft mounted therein, and a plurality of constantly-traveling flexible means for driving the shaft and restraining the body from abnormal throw.

4. In combination, a gyratory structure, a shaft mounted therein and provided with means for imparting a gyratory motion thereto, and a plurality of constantly-traveling flexible means for driving the shaft and restraining the structure from abnormal throw.

5. In combination, a gyratory structure, a shaft mounted therein and provided with means for imparting a gyratory motion thereto, a step-bearing for supporting the shaft, and a plurality of constantly-traveling flexible means for driving the shaft and restraining the structure from abnormal throw.

6. In combination, a gyratory structure, a shaft therefor, a pulley fixed to said shaft, and a plurality of flexible means for driving said pulley and restraining the structure from abnormal throw, said flexible means extending in different directions from the pulley.

7. In combination, a gyratory structure, a shaft therefor, a support for said shaft independent of the structure, a pulley fixed to said shaft, and a plurality of endless members for driving said pulley and restraining the structure from abnormal throw.

8. In combination, a freely-supported structure, means for preventing rotation thereof, a pulley for said structure, and a plurality of endless members for driving the pulley and restraining the structure from abnormal throw, said members pulling in opposite directions on the pulley.

9. In combination, a gyratory structure, a shaft therefor, a plurality of flexible members for driving said shaft and restraining the structure from abnormal throw, and stationary drivers independent of the structure for driving said flexible members.

10. In combination, a gyratory structure, a plurality of endless members for driving said structure and restraining the same from abnormal throw, drivers for said endless members, and means between the structure and said drivers for tensioning the endless members.

11. The combination of a gyratory structure, yielding supports therefor, a plurality of endless belts for driving the structure and restraining the same from abnormal throw, one of said belts being crossed, and stationary drivers for driving said belts.

12. In combination, a gyratory structure having centrally-disposed bearings, a shaft journaled in said bearings for imparting motion to the structure, a pulley fixed to the lower end of said shaft, two endless members extending in opposite directions from said pulley for driving the same and restraining the structure from abnormal throw, and two stationary drivers for driving said endless members.

13. In combination, a gyratory structure, endless belts for driving the structure and restraining the same from abnormal throw, said belts extending in different directions, and stationary drivers for driving said belts.

14. In combination a gyratory structure, a shaft therefor, an eccentric-pin fixed to said shaft and arranged in line with the center of gyration, a support for said eccentric-pin independent of the structure, and endless means for rotating the eccentric-pin and restraining the structure from abnormal throw.

15. In combination, a freely-suspended structure arranged to have a gyratory movement, a laterally movable rotatable shaft vertically positioned in said structure for actuating the same, and endless belts for driving the shaft and tending to restrain the same from lateral movement.

16. In combination, a freely-suspended structure, a laterally movable rotatable shaft therefor, eccentric weights on the shaft for imparting a gyratory motion to the structure, and endless means for driving said shaft and tending to restrain the structure from abnormal gyration.

17. In combination, a normally-gyratable body, a rotary member for said body, endless means engaging said rotary member to restrain the body from abnormal throw, and endless means for driving the rotary member and assisting in restraining the body from abnormal throw.

18. In combination, a gyratory structure, a rotary member for said structure, an endless member engaging said rotary member to assist in restraining the structure from abnormal throw, means for tensioning said endless member, and an endless member for driving the rotary member and assisting in restraining the structure from abnormal throw.

19. In combination, a normally-gyratable body, a pulley for driving said body, flexible means engaging said pulley and tending to restrain the body from abnormal throw, flexible means for driving the pulley and assisting in restraining the body from abnormal throw, and means for tensioning the last-mentioned flexible means.

20. In combination, a freely-supported body, an orbitally-movable gyrator therefor, a pulley for said gyrator, a support near said pulley, flexible means engaging the pulley and said support to assist in restraining the body from abnormal throw, and flexible means for driving said pulley and assisting in restraining the body from abnormal throw.

21. In combination, a freely-suspended structure, a gyrator therefor including a shaft extending through said structure, an endless member to restrain said shaft from abnormal throw, and an endless member to drive the shaft and assist in restraining the same from abnormal throw.

22. In combination, a normally gyratable body, bearings centrally-disposed in said body, a shaft journaled in said bearings, and free to move orbitally, endless means tending to restrain said shaft from abnormal throw, and endless means for driving said shaft and assisting in restraining the same from abnormal throw.

23. In combination, a gyratory structure, an eccentrically-weighted shaft journaled in said structure and capable of orbital movement, a pulley on said shaft, a rotary support near said pulley, flexible means engaging the pulley and said support to assist in restraining the structure from abnormal throw, and flexible means for driving the pulley and assisting in restraining the structure from abnormal throw.

24. In combination, a freely-suspended structure, a gyrator therefor, a support for said gyrator independent of the structure, flexible means engaging said gyrator and tending to restrain the structure from abnormal throw, and endless means for driving the gyrator and assisting in restraining the structure from abnormal throw.

25. In combination, a normally-gyratable structure, a shaft therefor, an eccentric-pin fixedly-connected to said shaft and constituting the center of rotation, a support for said pin independent of the structure, a pulley mounted on said eccentric-pin, a support near said pulley, an endless member engaging said pulley and said support to assist in restraining the structure from abnormal throw, and endless means engaging said pulley for driving the same and assisting in restraining the structure from abnormal throw.

26. In combination, a freely-supported body, a pulley for said body, a support near said pulley, flexible means engaging said support and the pulley to assist in restraining the body from abnormal throw, a flexible power transmission device for driving the pulley and assisting in restraining the body from abnormal throw, and guiding means for said power transmission device.

27. In combination, a normally-gyratable structure, a pulley therefor, an independently-supported endless member engaging said pulley to restrain the structure from abnormal throw, and an independently-supported flexible power transmission device leading to said pulley to drive the same and assist in restraining the structure from abnormal throw.

28. In combination, a normally-gyratable body, a rotary member for said body, endless means engaging said rotary member to restrain the body from abnormal throw, endless means for driving the rotary member and assisting in restraining the body from abnormal throw, and a stationary driver for said endless means.

29. In combination, a normally-gyratable body having centrally-disposed bearings, a shaft journaled in said bearings, eccentric weights fixed to said shaft, a pulley fixed to said shaft, an endless member extending in one direction from said pulley to assist in restraining the body from abnormal throw, and an endless member extending in an opposite direction from said pulley to drive the same and assist in restraining the body from abnormal throw.

30. In combination, a normally-gyratable structure, a shaft therefor, an eccentric-pin fixedly connected to said shaft and constituting the center of rotation, a step-bearing for said eccentric-pin, antifrictional means interposed between said step-bearing and the eccentric-pin, a pulley fixedly mounted upon the eccentric-pin, an independently-supported flexible device engaging said pulley to assist in restraining the structure from abnormal throw, and an endless flexible device engaging said pulley to drive the same and assist in restraining the structure from abnormal throw.

31. In combination, a normally-gyratable structure, a pulley thereto for actuating the same, an independent support near said pulley, means for adjusting said support, endless flexible means engaging the pulley and said support to assist in restraining the structure from abnormal throw, and endless flexible means engaging the pulley to drive the same and assist in restraining the structure from abnormal throw.

32. In combination, a normally-gyratable body, a pulley thereto for actuating the same, endless means engaging said pulley to assist in restraining the body from abnormal throw, a stationary driver capable of lateral adjustment, flexible means engaging the pulley and said stationary driver to drive the pulley and assist in restraining the body from abnormal throw, idlers engaging said flexible means to adjust the same, and means for adjusting said idlers.

33. In combination, a body, means freely supporting the same for gyration, a centrally-disposed, vertically-positioned shaft for said body for actuating the same, a support near said shaft independent of the body, endless means engaging said shaft and said support to restrain the body from abnormal throw, and endless means for driving said shaft and assisting in restraining the body from abnormal throw.

34. In combination, a gyratory structure, a shaft therefor, a step-bearing independent of the structure for supporting the shaft, a steadying device including an endless member tending to hold the structure in its true gyratory path, and means for driving said shaft.

35. In combination, a gyratory structure, endless means tending to restrain said structure from abnormal throw, a shaft to said structure for driving the same, an endless member for driving said shaft, and adjustable guiding means for leading said endless member to the shaft.

36. In combination, a gyratory structure, an endless member for steadying said structure, an endless member for driving said structure, and independent means for tensioning said endless members.

37. In combination, a gyratory structure, a shaft therefor capable of orbital movement, a stationary driver, and means under tension connecting the driver and the shaft for transmitting motion to the latter and restraining the same from abnormal throw.

38. In combination, a freely-supported body, a shaft therefor, a pulley fixed to said shaft, an endless member under tension engaging said pulley to drive the same and restrain the body from abnormal throw, and means for driving said endless restraining member, 39. In combination, a normally-gyratable structure, a shaft thereto, a pulley on said shaft to drive the same, endless flexible means for driving said shaft and restraining the structure from abnormal gyration, and means for driving said flexible means.

40. In combination, a freely-suspended structure, a shaft for actuating the same, and steadying means for said structure including oppositely-extending flexible members, one of which drives the shaft.

41. In combination, a normally-gyratable body, bearings centrally-disposed in said body, a shaft journaled in said bearings and free to move orbitally, an element to drive and restrain said shaft from abnormal orbital movement, and an element coacting with the first-mentioned element to restrain the shaft from abnormal movement.

42. In combination, a freely-supported structure, a gyrator therefor, a support for said gyrator independent of the structure, an element engaging said gyrator to drive the same and assist in restraining the structure from abnormal throw, and an endless element coacting with the first-mentioned element in restraining the structure from abnormal throw.

43. In combination, a normally-gyratable structure, a shaft therefor, an eccentric-pin fixedly-connected to said shaft and constituting the center of rotation, a support for said pin independent of the structure, a pulley mounted on said eccentric-pin, a support near said pulley, a flexible element engaging said pulley and said support to assist in restraining the structure from abnormal throw, and an endless member engaging said pulley to drive the same and coact with the flexible element in restraining the structure from abnormal throw.

44. In combination, a freely-supported body, a pulley for said body, a support near said pulley, an endless member engaging said support and the pulley to assist in restraining the body from abnormal throw, and an endless flexible member to drive the pulley and coact with the endless member in restraining the body from abnormal throw.

45. In combination, a normally-gyratable body, a rotary member for said body, an endless member engaging said rotary member to assist in restraining the body from abnormal throw, a second endless member to drive the rotary member and coact with the first-mentioned endless member in restraining the body from abnormal throw, and a stationary driver for the last-mentioned endless member.

46. In combination, a normally-gyratable body having centrally-disposed bearings, a shaft journaled in said bearings, eccentric weights fixed to said shaft, a pulley fixed to said shaft, an endless flexible element extending in one direction from said pulley to assist in restraining the body from abnormal throw, and an endless flexible member extending in an opposite direction from said pulley to drive the same and assist in restraining the body from abnormal throw.

47. In combination, a normally-gyratable structure, a pulley thereto for actuating the same, an independent support near said pulley, means for adjusting said support with relation to the pulley, an endless element engaging the pulley and said support to assist in restraining the structure from abnormal throw, and an endless element engaging the pulley to drive the same and assist the first-mentioned endless element in restraining the structure from abnormal throw.

48. In combination, a normally-gyratable body, a pulley thereto for actuating the same, a flexible element engaging said pulley to assist in restraining the body from abnormal throw, a stationary driver capable of lateral adjustment, and an element engaging the pulley and said stationary driver to drive the pulley and coact with the first-mentioned element in restraining the body from abnormal throw.

49. In combination, a normally-gyratable body, an endless flexible member to assist in restraining said body from abnormal throw, and a second endless flexible member to drive the body and coact with the first-mentioned member in restraining the body from abnormal throw.

50. In combination, a gyratory structure, restraining means for said structure, and driving means for said structure which coöperates with the restraining means to hold the structure in its true gyratory path.

51. In combination, a gyratory structure, a shaft therefor, restraining means to secure the shaft and the structure from abnormal throw, and driving means for driving the shaft and the structure which coöperates with the restraining means in overcoming abnormal throw of the shaft and the structure.

52. In combination, a structure capable of gyration, a vertically-positioned shaft mounted therein, a stationary support for said shaft independent of the structure, means to restrain the structure from abnormal throw, and means for driving the shaft and coöperating with the restraining means to hold the structure from abnormal throw.

53. In combination, a gyratory structure, a shaft therefor, a support for said shaft having an upwardly-extending wall forming a lubricant chamber, means for driving the shaft and restraining the structure from abnormal throw, and means coöperating with said driving and restraining means in overcoming abnormal throw of the structure.

54. The combination of a freely-supported structure, an eccentrically-weighted shaft therefor, endless flexible means for driving the shaft and restraining the structure from abnormal throw, and endless flexible means coöperating with the flexible driving and restraining means in overcoming abnormal throw of the structure.

55. In combination, a freely-supported body, an orbitally-movable gyrator therefor, means tending to restrain the body from abnormal throw, and driving means for the gyrator coöperating with the restraining means to hold the body in its true gyratory path.

56. In combination, a suspended structure, a gyrator therefor including a shaft extending through said structure, means tending to restrain the structure from abnormal throw, and driving means for driving the shaft and coacting with the restraining means in holding the structure in its true gyratory path.

57. In combination, a normally-gyratable body, bearings centrally-disposed therein, a shaft extending loosely through said bearings, means engaging said shaft to restrain the body from abnormal gyration, and means for driving said shaft and coöperating with the restraining means to hold the body from abnormal gyration.

58. In combination, a gyratory structure, an eccentrically-weighted shaft journaled therein and capable of orbital movement, means tending to restrain the structure from abnormal throw, and means which drive the shaft and coöperate with the restraining means in holding the structure in its true gyratory path.

59. In combination, a freely-suspended structure, a gyrator therefor, a support for said gyrator independent of the structure, means tending to restrain the structure from lunging, and means which drive the gyrator and coact with the restraining means in steadying the structure.

60. In combination, a gyratory structure, a shaft therefor, an eccentric-pin fixed to said shaft and arranged in line with the center of gyration, a support for said eccentric-pin independent of the structure, endless means which rotate the eccentric-pin and tend to restrain the structure from abnormal throw, and a device coöperating with said endless means in restraining the structure from abnormal throw.

61. In combination, a gyratory structure, a shaft for driving the same, yielding power transmission devices leading to said shaft, and an endless restraining member tending to hold the structure in its true gyratory path.

62. In combination, a freely-supported structure, a shaft for imparting a gyratory motion thereto, an endless restraining member for the structure, and power transmission devices leading to the shaft and coöperating with the restraining member to hold the structure in its true gyratory path.

63. In combination, a structure, means freely suspending the same for gyration, a shaft for the structure, a stationary driver, flexible connections independent of the suspending means between the driver and the shaft whereby the latter is driven from the former, and endless restraining means tending to hold the structure in its true gyratory path.

64. In combination, a structure freely-supported, a vertically-positioned shaft mounted therein to impart a gyratory motion thereto, constantly-traveling flexible means for driving the shaft and tending to restrain the structure from abnormal throw, and restraining means coöperating with said endless flexible means in holding the structure in its true gyratory path.

65. In combination, a gyratory structure having centrally-disposed bearings, a shaft journaled in said bearings for imparting motion to the structure, a pulley fixed to the lower end of said shaft, flexible means engaging said pulley for driving the same, and an endless restraining member engaging said pulley to restrain the structure from abnormal gyration.

66. The combination of a normally-gyratable structure, an independently-supported endless belt for steadying said structure, and flexible means for driving said structure.

67. The combination of a structure, means for gyrating the same, a pulley for said structure, an independently-supported endless device traveling around said pulley to steady the structure, and a second endless device traveling around said pulley to drive the same.

68. The combination of a normally-gyratable structure, endless restraining means for steadying said structure, independent means for supporting and tensioning said restraining means, and yielding means for driving the structure.

69. In combination, a normally-gyratable body having centrally-disposed bearings, a shaft journaled in said bearings, eccentric-weights fixed to said shaft, a pulley on said shaft, an endless member engaging said pulley to steady the body, a stationary driver, and a yielding power transmission device connecting said driver and shaft.

70. In combination, a normally-gyratable structure, a pulley therefor, an independently-supported endless member engaging said pulley to restrain the structure from abnormal throw, a stationary driver, and yielding means connecting said driver and the structure.

71. In combination, a normally-gyratable body, a rotary member for said body, endless means constantly engaging said rotary member to restrain the body from abnormal throw, a stationary driver, and yielding means connecting said stationary driver and the body.

72. In combination, a freely-supported structure, a pulley for said structure, supports near said pulley, flexible means engaging said supports and the pulley and tending to restrain the structure from abnormal throw, a stationary driver, and a yielding power transmission device between said driver and the structure.

73. In combination, a normally-gyratable structure, a shaft therefor capable of lateral movement in any direction, an eccentric pin fixedly-connected to said shaft and constituting the center of rotation, a support for said pin independent of the structure, a pulley mounted on said eccentric-pin, supports near said pulley, endless means engaging the pulley and said supports tending to restrain the structure from abnormal throw, a stationary driver, and a yielding connection between the driver and the shaft.

74. In combination, a freely-suspended structure, a gyrator therefor, a support for said gyrator independent of the structure, flexible means engaging said gyrator and tending to restrain the structure from abnormal throw, a stationary driver, and yielding means operably-connecting said driver and the gyrator.

75. In combination, a normally-gyratable body, bearings centrally-disposed in said body, a shaft journaled in said bearings and free to move orbitally, endless means constantly tending to restrain said shaft from abnormal throw, a stationary driver, and yielding means operably-connecting said driver and the shaft.

76. In combination, a normally-gyratable body, a rotary member for said body, endless means constantly engaging said rotary member to restrain the body from abnormal throw, a stationary driver, and yielding means between said driver and the body for actuating the latter.

77. In combination, a normally-gyratable body, a pulley for said body, flexible means engaging said pulley and tending to restrain the body from abnormal throw, means for tensioning said flexible means, a stationary driver, and yielding means between said driver and the body whereby the latter is driven by the former.

78. In combination, a freely-supported structure, means for preventing rotation thereof, a pulley for said structure, supports near said pulley, endless means engaging the pulley and said supports to restrain the structure from abnormal throw, a stationary driver, and yielding means operably engaging said driver and the pulley whereby the latter is actuated by the former.

79. In combination, a normally-gyratable structure, a pulley thereto, endless means engaging said pulley to restrain the structure from abnormal throw, idlers engaged by said endless means, and means for adjusting said idlers.

80. In combination, a normally-gyratable structure, a pulley thereto, an independent support near said pulley, means for adjusting said support laterally, means for adjusting said support longitudinally, endless flexible means engaging the pulley and said support to restrain the structure from abnormal throw, a stationary driver, and yielding means between said driver and the structure whereby the latter is actuated by the former.

81. In combination, a body, means freely-supporting the same for gyration, a centrally-disposed vertically-positioned shaft to said body for actuating the same, supports at opposite sides of said shaft independent thereof and of the body, endless means operably-connecting the shaft and said supports to restrain the body from abnormal throw, a stationary driver, and yielding means between said driver and the shaft whereby the latter is driven by the former.

82. In combination, a freely supported structure, means for preventing rotation thereof, a pulley for said structure, supports near said pulley, endless means engaging the pulley and said supports to restrain the structure from abnormal throw, a stationary driver, and yielding means between said driver and the structure whereby the latter is actuated by the former.

83. In combination, a gyratory structure, a shaft therefor capable of orbital movement, a stationary driver, means under tension connecting the driver and the shaft for transmitting motion to the latter and restraining the same from abnormal throw, and means independent of the structure for driving the first-mentioned means.

84. In combination, a gyratory structure, a shaft therefor, a pulley fixed to said shaft, an endless member under tension engaging said pulley to drive the same and restrain the body from abnormal throw, and means for driving said endless restraining member, said means being independent of the structure.

In testimony whereof I affix my signature, in the presence of two witnesses.

GEORGE W. COMBS.

Witnesses:
F. G. FISCHER,
M. COX.

Copies of this patent may be obtained for five cents each, by addressing the "Commissioner of Patents, Washington, D. C."